United States Patent
Grosse et al.

(10) Patent No.: US 9,096,277 B2
(45) Date of Patent: Aug. 4, 2015

(54) GROUP OF MOTOR VEHICLES

(71) Applicant: Bayersiche Motoren Werke Aktiengesellschaft, Munich (DE)

(72) Inventors: Ronny Grosse, Eichenau (DE); Roland Rill, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/282,225

(22) Filed: May 20, 2014

(65) Prior Publication Data

US 2014/0252805 A1 Sep. 11, 2014

Related U.S. Application Data

(63) Continuation of application No. PCT/EP2012/072828, filed on Nov. 16, 2012.

(30) Foreign Application Priority Data

Nov. 21, 2011 (DE) .......................... 10 2011 086 709

(51) Int. Cl.
B62D 25/20 (2006.01)
B62D 25/08 (2006.01)

(52) U.S. Cl.
CPC .......... B62D 25/2027 (2013.01); B62D 25/088 (2013.01); B62D 25/20 (2013.01); B62D 25/2081 (2013.01); B62D 25/082 (2013.01); B62D 25/087 (2013.01)

(58) Field of Classification Search
CPC .................. B62D 25/2027; B62D 25/2081
USPC ................. 296/193.07, 193.04, 193.08, 198
See application file for complete search history.

(56) References Cited

U.S. PATENT DOCUMENTS

| | | | | |
|---|---|---|---|---|
| 4,881,756 A * | 11/1989 | Kumasaka et al. | ........... | 280/785 |
| 4,887,859 A * | 12/1989 | Aper | ........... | 296/26.08 |
| 4,968,087 A * | 11/1990 | Goria | ........... | 296/193.04 |
| 6,003,935 A * | 12/1999 | Kalazny | ........... | 296/204 |
| 6,896,319 B1 * | 5/2005 | Huang et al. | ........... | 296/193.04 |
| 8,727,426 B2 * | 5/2014 | Vitale et al. | ........... | 296/193.04 |
| 2002/0057004 A1 * | 5/2002 | Corcoran et al. | ........ | 296/203.01 |
| 2007/0052261 A1 * | 3/2007 | Andre et al. | ........... | 296/193.04 |
| 2009/0236877 A1 * | 9/2009 | Peschansky et al. | ..... | 296/203.01 |
| 2015/0042129 A1 * | 2/2015 | Cho et al. | ........... | 296/203.04 |

FOREIGN PATENT DOCUMENTS

| | | |
|---|---|---|
| DE | 198 60 794 A1 | 7/2000 |
| DE | 10 2008 055 738 A1 | 5/2010 |
| WO | WO 2006/026942 A1 | 3/2006 |
| WO | WO 2010/017754 A1 | 2/2010 |

OTHER PUBLICATIONS

International Search Report dated Feb. 14, 2013 (Two (2) pages).

* cited by examiner

*Primary Examiner* — Jason S Morrow
(74) *Attorney, Agent, or Firm* — Crowell & Moring LLP

(57) ABSTRACT

In the case of motor vehicles from at least two vehicle series assigned to different vehicle classes, a particularly economical manufacturing of the vehicle body of the motor vehicles is achieved in that only the forward section of the rear longitudinal members has a different design depending on the vehicle class, while the center section and the rear section of the rear longitudinal members have a vehicle-class-spanning uniform construction.

20 Claims, 3 Drawing Sheets

GROUP OF MOTOR VEHICLES

CROSS REFERENCE TO RELATED APPLICATIONS

This application is a continuation of PCT International Application No. PCT/EP2012/072828, filed Nov. 16, 2012, which claims priority under 35 U.S.C. §119 from German Patent Application No. 10 2011 086 709.0, filed Nov. 21, 2011, the entire disclosures of which are herein expressly incorporated by reference.

BACKGROUND AND SUMMARY OF THE INVENTION

The invention relates to a group of motor vehicles.

Motor vehicles are categorized in different vehicle classes as a function of their shape, their size and/or their pricing. Instead of the term "vehicle class," the term "vehicle segment" is also used. The European Commission, for example, has defined the following vehicle classes for the purpose of defining the market with respect to competition: Minicars, subcompacts, midsized cars, top midsized cars, top-end cars, luxury class cars. The German Federal Motor Transport Authority (Deutsches Kraftfahrt-Bundesamt) differentiates between the following vehicle classes: Minicars, subcompacts, compacts, midsized cars, top midsized cars, top-end cars. There are further additional categories, such as cross-country vehicles, sports cars, convertibles, minivans, multi-purpose vehicles.

For increasing the economic efficiency of the manufacturing process, motor vehicle manufacturers use uniform shell components as much as possible for the body shells of their motor vehicles. Here, it is the goal to comprehensively use such "common parts" also in the case of motor vehicles of different vehicle classes. The use of "common parts" can clearly reduce investments in tools and facilities in the pressing plant and in body shell construction. Some manufacturers of motor vehicles refer to the use of common parts, for example, by applying the term "platform strategy".

In the case of vehicle body floor assemblies for motor vehicles of different vehicle classes, different track widths at the rear axle, in the case of the same screw-down points for the rear axle, as a rule, are represented by way of different offsets of the rear wheels. However, a spreading of the track width can only take place to a limited extent. A further differentiation characteristic between the individual vehicle classes is the loading width which, in the case of fold-down seatbacks, is available for the through-loading of transported goods between the passenger compartment and the trunk. The implementation of different loading widths between the vehicle classes therefore requires different vehicle body floor assemblies and/or different rear axles.

It is an object of the invention to provide a new approach for the manufacturing of body shells for motor vehicles of different vehicle classes which, while the use of common parts in the rearward section of the body shell of the floor assembly of a motor vehicle body (also called "rear body end") is as extensive as possible, nevertheless permits a clear differentiation between the various vehicle classes. The differentiation is to take place particularly by a spreading of the loading width.

This object is achieved by a group of motor vehicles.

In connection with the present invention, a group of motor vehicles is the aggregate of motor vehicles of at least a first and a second vehicle series, the two vehicle series belonging to different vehicle classes. Naturally, the body shells of more than two vehicle series may also be combined to form a group of motor vehicles.

According to the invention, the rear body end of motor vehicles of different vehicle classes is designed such that the rear longitudinal members are uniform in their center section and rear section; i.e. are therefore constructed as common parts. According to the invention, only the forward section of the rear longitudinal members has a different design depending on the vehicle class. The forward and center section of the rear longitudinal members are mutually connected to a one-piece longitudinal member by welding. By using the longitudinal members, which are uniform in their center sections and rear sections, considerable savings are achieved with respect to all vehicle classes, particularly with respect to investments for deep-drawing dies for producing the rear longitudinal members by sheet metal shell construction. Also in the case of rear longitudinal members which consist at least partially of extruded sections or cast materials, considerable savings can be achieved by the standardization of the center section and the rear section of the rear longitudinal member.

A spreading of the width at the rearward floor assembly of the motor vehicles of the different vehicle classes can be achieved in a particularly efficient manner by means of the invention. The forward sections of the rear longitudinal members, which are designed differently according to the invention, have a different offset in the transverse (Y-direction) of the vehicle. In this manner, realistic spreads of the width can be achieved in the rear body end of the motor vehicles of the individual vehicle series, whereby greater track width differences can be implemented than by the variation of the offsets of the rear wheels. Because the rear body ends have different widths in the case of the motor vehicles according to the invention, depending on the vehicle class, differently-sized distances will occur between the interior surfaces of the rear wheel wells, so that different trunk volumes and in the case of fold-down seatbacks of the backseats, different loading widths between the passenger compartment and the trunk are created in the respective vehicle classes.

In the same manner, as an alternative or in addition, by means of the invention, a longitudinal spread of the rearward floor assembly of the individual motor vehicles of the different vehicle classes can be implemented. In particular, by differently-designed forward sections of the rear longitudinal members, an adaptation takes place to different positions of the so-called heel plate cross-member with respect to the connection line through the wheel contact points of the rear wheels. The terms "heel plate" and "heel plate cross-member" are further explained below. As a result of the different design of the forward sections of the rear longitudinal members, different positions of the heel plate cross-member in the longitudinal direction of the motor vehicle (X-direction), for example, caused by tank volumes of different sizes in the individual vehicle classes, can be compensated.

Furthermore, in the same manner, by means of the invention, as an alternative or in addition, different ground clearances of the motor vehicles of the different vehicle classes can be implemented in that, as a result of differently-designed forward sections of the rear longitudinal members, an adaptation takes place to lower edges of different heights of the lateral longitudinal members (sills) of the motor vehicles. By means of the invention, an offset in the vertical direction (Z-direction) of the motor vehicles can thereby be compensated.

The motor vehicles of two vehicle classes may be combined in the group of motor vehicles. In this case, the vehicle-class-spanning concept according to the invention is mainly but not exclusively suitable for "neighboring" vehicle classes, for example, for vehicles of the compact class and the midsized class or for motor vehicles of the midsized class and the top midsized class. Naturally, the group of motor vehicles may also be expanded to more than two vehicles classes.

The term "common part" (like the term "uniform component") comprises those shell parts which are produced by means of the same deep-drawing die. Subsequent to the production in the pressing plant, these "common parts" can be changed in their length dimension by shortening or by lengthening. During the shortening by cutting to length, for example, a longitudinal member, which is used in a comprehensive manner for motor vehicles of two or more vehicle classes, depending on the vehicle class, is shortened by trimming at one of its end sections for the motor vehicles of the smaller vehicle class(es). As an alternative, the longitudinal member can also be lengthened by attaching an extension piece depending on the vehicle class, by riveting, welding, screwing, gluing, etc. Basically, depending on the vehicle class, different hole patterns for the connection of the "common part" with the shell body and/or with attachments can be made at the "common parts," by stamping, drilling, etc. However, it is essential for the "common parts" that, after the production in the same deep-drawing die, no further shaping changes take place. By the use of vehicle-class-spanning uniform deep-drawing die, the investment costs for the manufacturing devices are considerably reduced.

In an embodiment of the invention, the forward sections of the rear longitudinal members are connected with the insertion of a heel plate and/or of a heel plate cross-member with a uniformly-wide forward floor panel. The combination of the uniformly-wide forward floor panel and differently-shaped forward sections of the rear longitudinal members permits the extremely economical manufacturing of body shells for different vehicle classes, in which case the body shells of the individual vehicle classes are distinguished by differently-wide rear body ends. As required, the rear body ends of the motor vehicles of the individual vehicle classes may additionally differ in their length and/or in their ground clearance. In addition, the body shells of the individual vehicle classes, as a rule, differ by differently-wide lateral longitudinal members (sills), in which case, however, the interior surfaces of the lateral longitudinal members, corresponding to the uniform forward floor panel, in a vehicle-class-spanning manner have a uniform design and the same position.

As mentioned above, it is essential that the forward floor panel constructed as a common part is used for the shell bodies of the different vehicle series. This forward floor panel, which is uniform in its width, can be adapted, for example, by cutting to different vehicle lengths and/or wheel bases, but, as a result of the uniform deep-drawing operation, is uniform for all shell bodies with respect to its shaping. By using the same deep-drawing tools for the forward floor panels of all shell bodies, a clear reduction of investment costs for the manufacturing facilities can be achieved.

The forward floor panel is, for example, constructed in one piece. As an alternative, the forward floor panel may also be composed of several components. In other words, a forward floor panel for the shell bodies of the different vehicle series which is composed of several components can also be produced uniformly, thus by means of the same deep-drawing dies and also with the manufacturing steps for joining (preferably) welding the individual deep-drawn parts. As explained above, in the case of both variants, the forward floor panel for the shell bodies of the different vehicle series is uniformly wide.

The rear longitudinal members do not directly adjoin the forward floor panel but are indirectly connected with the latter with the insertion of a "heel plate area". This "heel plate area" comprises the actual heel plate as well as a heel plate cross-member arranged adjacent thereto, which reinforces the shell body in the area of the backseats. The "heel plate area" is used as a transition area between the uniform longitudinal members constructed according to the invention and the forward floor panel preferably constructed as a common part.

In an embodiment of the invention, the heel plate is also constructed as a common part. The heel plate cross-member is normally implemented in a shell construction. In an advantageous implementation of the invention, at least one shell or at least a portion of the shells is also constructed as a common part. In the case of the heel plate cross-member, at least the two sections situated laterally on the outside are preferably constructed as common parts. These sections are those components which directly adjoin the forward sections of the rear longitudinal members.

The connection between lateral and rear longitudinal members preferably takes place by way of flanges at the forward sections of the rear longitudinal members, which are connected with the lateral longitudinal members particularly by welding.

In a embodiment of the invention, the forward sections of the rear longitudinal members have a fastening device for at least one component of the rear axle of the vehicle, for example, a receiving device for at least one control arm of the rear axle.

In an advantageous embodiment of the invention, the rearward sections of the rear longitudinal members have a different length depending on the vehicle class. Therefore, rear longitudinal members for rear body ends of different lengths are provided for the motor vehicles of the individual vehicle series within the group of motor vehicles. As explained in connection with the definition of the term "common part," the length adaptation takes place by cutting to length (trimming) or by lengthening (attaching). Cutting to length or lengthening are production steps which are carried out as a subsequent measure at rear longitudinal members previously produced by means of a uniform deep-drawing die. Comparatively low labor and tool costs occur for these subsequent measures at the rear longitudinal members.

For increasing the stability of the rear body end, the rear longitudinal members of the two vehicle sides preferably are mutually connected by a rear cross-member. For achieving the spread of the width, the rear cross-member is constructed with a different width in the case of the motor vehicles of the individual vehicle classes, the different widths preferably being generated by the trimming or lengthening of common parts. Advantages are further the result of the use of "width-spread" rear axles, which are composed of a number of common parts which are as numerous as possible.

In an embodiment of the invention, hole patterns for jack housings are provided at the forward sections of the rear longitudinal members, which jack housings are placed such, depending on the vehicle series, that a uniform distance from the longitudinal center line of the vehicle and/or a uniform distance from the forward jack housings is obtained for the hole patterns. Since, during the final assembly of the motor vehicles, these jack housings are used as coupling points for transport devices by which the motor vehicles are moved along the production line, as a result of the standardization of the hole patterns for the jack housings, uniform vehicle-class-spanning transport devices can be used, which leads to savings of production costs.

The position designations "front" and "rear" used in connection with the present invention as well as terms derived therefrom relate to the installation position of the respective components in the motor vehicle and to the driving direction of the motor vehicle.

A conceivable embodiment of the invention is illustrated in the drawing and will be explained in detail in the following.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
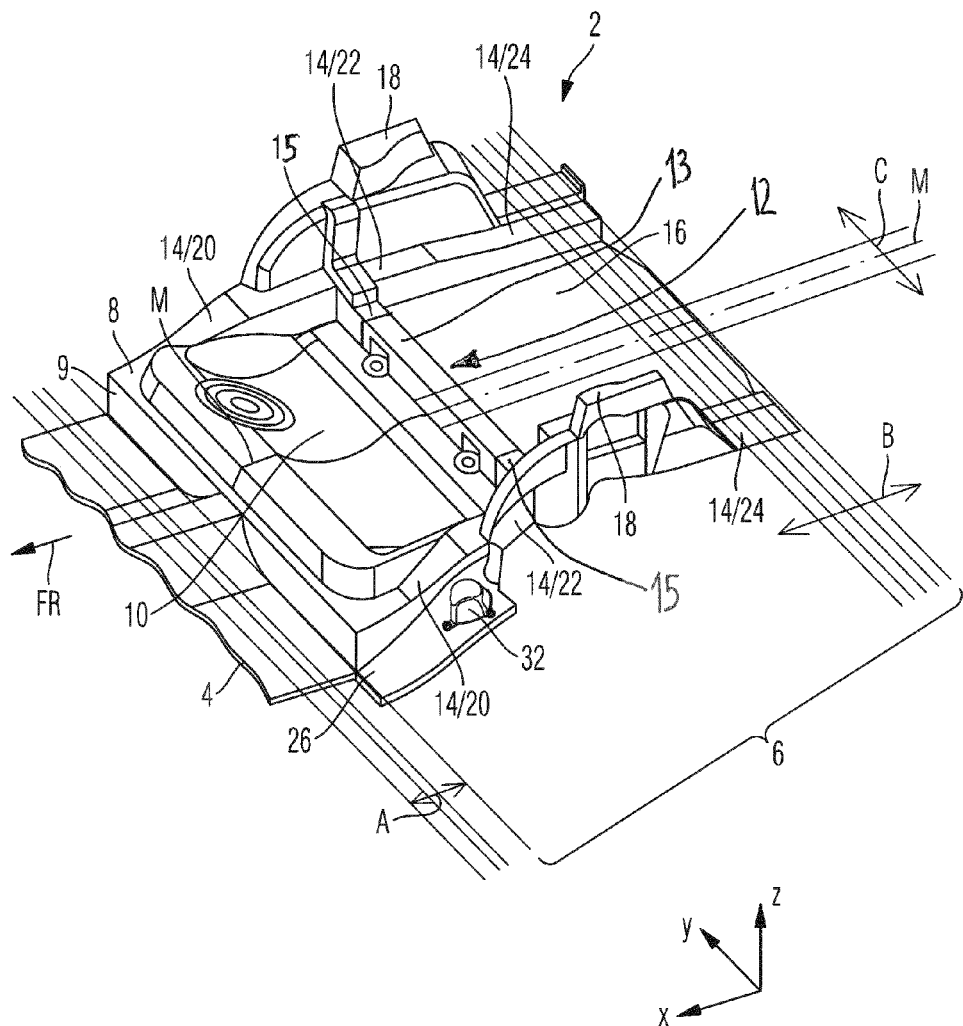
FIG. 1 is a perspective view of the rearward section of a shell floor assembly of a motor vehicle, with a schematic view of spreads of the lengths and widths of the shell.

FIG. 1 is a schematic view of the rearward area of a vehicle body shell of a motor vehicle. The longitudinal center line of the vehicle is marked M. A section of the forward floor panel 4 as well as the entire rear body end 6 are shown of the floor assembly of the vehicle body shell marked 2 in its entirety. The forward floor panel 4 is adjoined by a heel plate 9, a heel plate cross-member 8 as well as a rearward floor panel 10 and a rear cross-member 12. Furthermore, rear longitudinal members 14, a trunk floor 16 and rear wheel well liners 18 are illustrated. The longitudinal vehicle direction, which corresponds to the driving direction FR, is marked X. The transverse vehicle direction Y and the vertical vehicle direction Z are also illustrated.

The principle of the implementation of vehicles of different vehicles classes is illustrated in FIG. 1. Different lengths of the floor assembly 2 can be implemented, for example, on the one hand, by trimming the forward floor panel 4 in the X-direction of the motor vehicle—see double arrow A. The forward floor panel 4 is preferably uniform in its width (Y-direction), which results in a uniform position of the interior surface of lateral longitudinal members (sills) 11. In addition, the uniform forward floor panel 4 makes it possible to obtain a uniform heel plate 9 and/or a uniform heel plate cross-member 8. The heel plate cross-member 8 may also be uniformly constructed in a manner that only partially covers vehicle classes, for example, in that a shell or individual shells of a heel plate cross-member 8 implemented in a shell construction has or have a uniform implementation.

In addition, the length of the rear body end 6 of the floor assembly 2 can be adapted by trimming the rear longitudinal members 14 and by trimming the trunk floor 16 inserted between the rear longitudinal members 14—see double arrow B.

Different widths of the rear body end 6 (transverse direction Y of the motor vehicle) can be achieved by rear longitudinal members 14 designed according to the invention, in connection with trunk floors 16 of different widths as well as cross-members 12 of different widths—see double arrow C.

In the present embodiment, the cross-members 12 are composed of a center section 13 as well as two exterior adapter pieces 15. The adapter pieces 15 are identical for the motor vehicles of all vehicle classes. The width adaptation takes place by the cutting to length of the uniformly manufactured center section 13.

Figure 2:
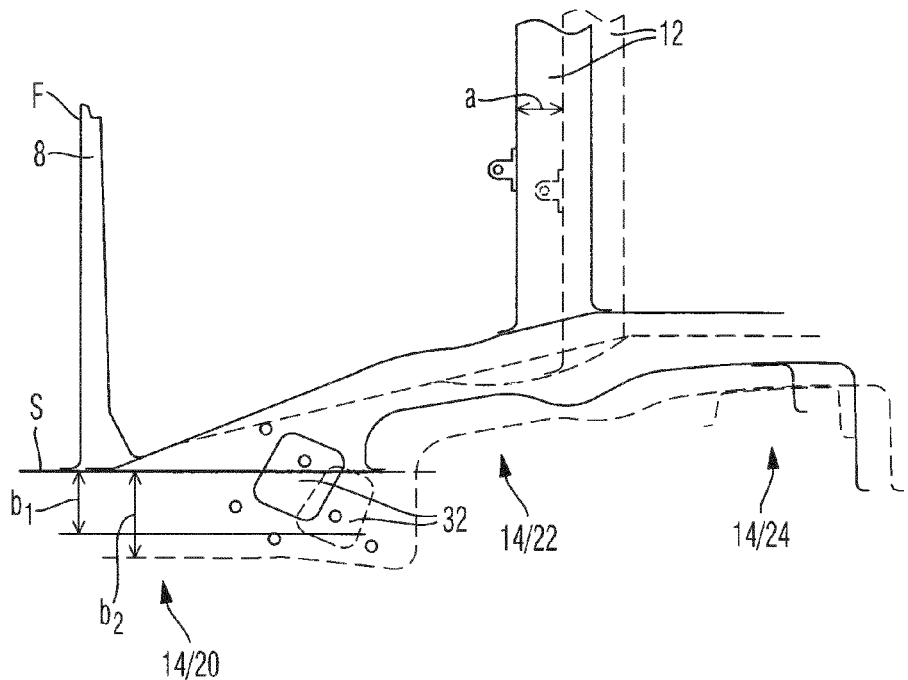
FIG. 2 is a stacked top view of the rear body ends of motor vehicles of two different vehicle classes, with congruence of the heel plate cross-members in the X-direction.
Figure 3:
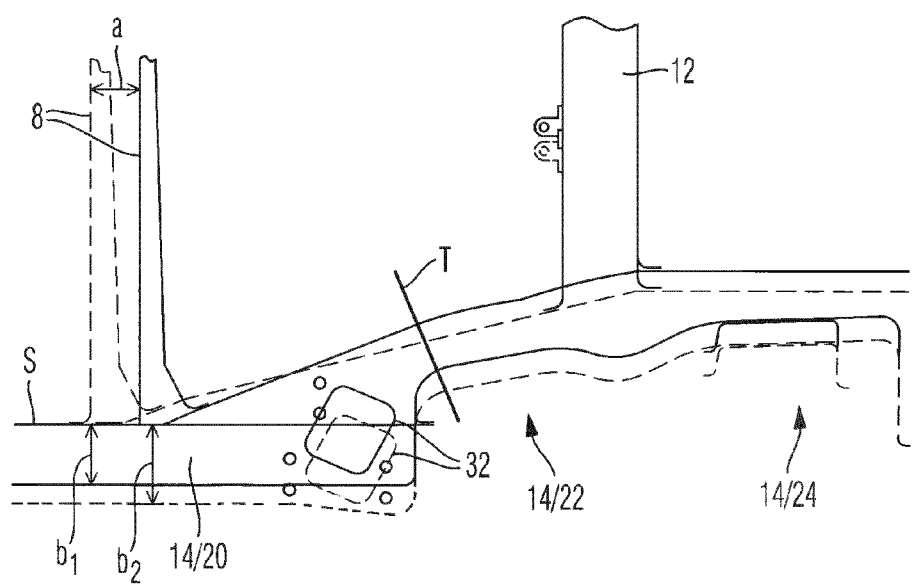
FIG. 3 is a view corresponding to FIG. 2, with congruence of the center of the rear wheels of the motor vehicles in the X-direction.

The stacked representations of FIGS. 2 and 3 illustrate in detail how the spreads of the width and length (thus, in the Y and X directions respectively of the motor vehicles) are achieved. In this case, the components of the rear body end 6 illustrated by solid lines are assigned to motor vehicles of a first vehicle series with a smaller width and length of the rear body end 6. The components of the shell illustrated by broken lines are part of motor vehicles of a second vehicle series, which are distinguished by a greater width and length of the rear body end 6. FIGS. 2 and 3 each only show the left side of the motor vehicles. The right side of the motor vehicles has a minor-inverted construction. The motor vehicles of the two vehicle series together from the group of motor vehicles on which the invention is based.

The rear longitudinal member 14 is a component whose forward section 20, depending on the affiliation of the motor vehicle with a certain vehicle series, has an individualized design. The rear longitudinal member 14 is constructed in its center and rearward section 22 and 24 respectively as a one-piece common part for all motor vehicles of the group, the length of the rearward section 24 being adapted, for example, by cutting.

FIG. 3 illustrates the separating line T between the forward section 20 and the center section 22 of the longitudinal member 14. The two sections 20 and 22 are preferably connected with one another by welding.

By means of the above-described concept, a spread of the width of the rear body end (in the Y-direction of the motor vehicle) is achieved, with different distances b1 and b2 of the outer edges of the rear longitudinal members from a uniform contact surface S of the rear longitudinal members 14 on the interior side of lateral longitudinal members 11. Depending on the vehicle series, the distances between the outer edges of the rear longitudinal members 14 and the longitudinal center line M of the vehicle are correspondingly different.

The uniform contact surface S is based on the uniform forward floor panel 4 and the resulting uniform heel plate cross-member 8.

As an alternative or in addition, when the motor vehicles of different vehicle series are implemented according to the invention, an offset a is achieved in the X-direction (see FIGS. 2 and 3). This offset a permits the use of rearward floor panels 10 of different lengths and therefore, for example, the accommodation of fuel tanks of different sizes according to the vehicle series. As a function of the offset a, in the case of motor vehicles of the individual vehicle series, the distance differs between the connection lines of the wheel contact points 34 of the not shown rear wheels and the heel plate cross-members 8. The offset a therefore affects the wheel base of the motor vehicles of the individual vehicle series.

In addition or as an alternative, by the variation of the forward sections 20 of the rear longitudinal members 14, different distances can also be achieved between the lower edges of the rear longitudinal members 14 and the lower edges of the lateral longitudinal members 11 (in the vertical direction Z of the motor vehicles) in order to, for example, utilize the different ground clearances depending on the vehicle series.

Figure 4:
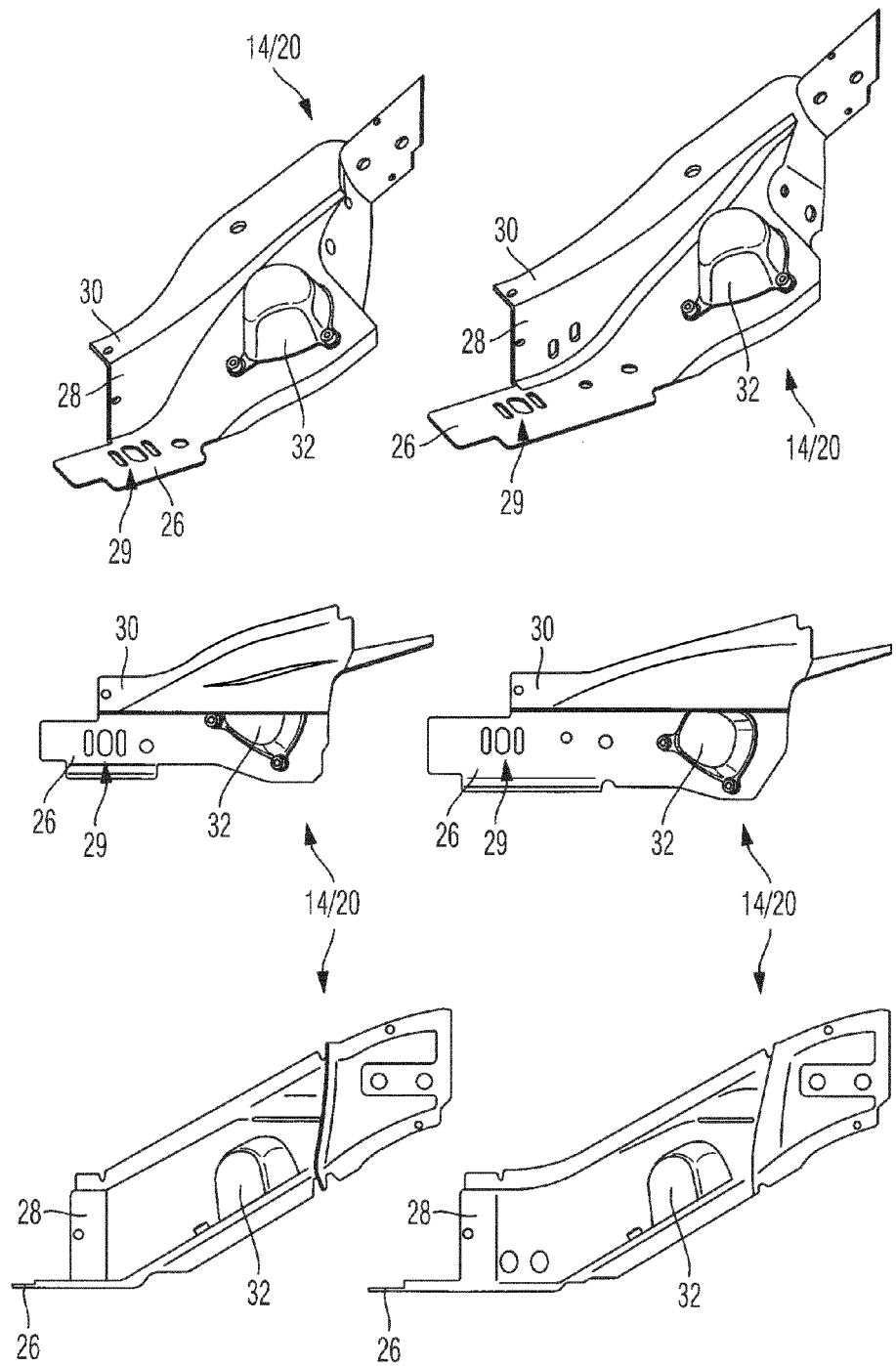
FIG. 4 are three different views (perspective, top view and side view) of the forward sections of rear longitudinal members of two motor vehicles of different vehicle classes.

The different geometries of the forward sections 20 of the rear longitudinal members 14 of the two vehicle series are illustrated in different views of FIG. 4. Here, the forward sections 20 of the rear longitudinal member 14, in each case, pertaining to the motor vehicle with a smaller vehicle width are illustrated in the left part of FIG. 4.

In FIGS. 1 and 4, flanges 26 are illustrated at the forward sections 20 of the rear longitudinal members 14. The flanges 26 adjoin the underside of not illustrated lateral longitudinal members of the individual motor vehicles and are connected with the lateral longitudinal members by welding. The vertical and horizontal surfaces of the forward sections 20 adjoining the heel plate cross-member 12 are marked 28 and 30. By way of the surfaces 28 and 30, the longitudinal member 14 is welded to the heel plate cross-member 8. The surface 28 corresponds to the contact surface S illustrated in FIGS. 2 and 3.

The flanges 26 at the forward sections 20 of the rear longitudinal members 14 have a hole pattern 29, which is assigned to not illustrated jack housings at the underside of the lateral longitudinal members. During the final assembly of the motor vehicles, these jack housings are used as coupling points for transport devices by which the motor vehicles are moved along a production line.

As illustrated particularly in the two center representations of FIG. 4 (top view), the hole patterns 29 are placed at the flanges 26 such that, for motor vehicles with a smaller vehicle width (and a shorter vehicle length corresponding to the offset along the double arrow A in FIG. 1) as well as for the motor vehicles with a greater vehicle width (and a greater vehicle length corresponding to the offset along the double arrow A in FIG. 1) a uniform position of the hole pattern 29 is achieved, with respect to the longitudinal center line M (Y-direction) of the vehicle as well as with respect to the distance from the not illustrated forward jack housings (X-direction). Naturally, the standardization of the hole pattern 29 may also be limited to only one direction preferably in the Y-direction.

In the case of both vehicle series, a uniform fastening device (receiving cup 32) is used for the fastening of not illustrated control arms of the rear axle.

The invention can be summarized as follows: In the case of motor vehicles of at least two different vehicle series, which are to be assigned to different vehicle classes, a particularly economical manufacturing of the vehicle body shell of the vehicles is achieved in that only the forward section 20 of the rear longitudinal members 14 is constructed differently depending on the vehicle class. The center section 22 and the rearward section 24 of the rear longitudinal members 14 have a uniform vehicle-class-spanning construction. As a result, uniform center and rearward sections 22 and 24 of the longitudinal member 14 can consistently be used for all motor vehicle. As a result, a variation of the vehicle width and/or the loading width and/or the track width and/or the length and/or the ground clearance becomes possible in the rear body end 6 of the motor vehicle, in which case only the forward sections 20 of the longitudinal members 14 are to be designed individually depending on the vehicle class.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A group of motor vehicles, comprising motor vehicles from at least two vehicle series belonging to different vehicle classes, having a rearward floor assembly respectively with two lateral rear longitudinal members, wherein the rear longitudinal members of the motor vehicles from the at least two vehicle series, respectively, have uniform center and rearward sections, while having different forward sections, wherein the forward and center sections being connected with one another and the forward sections being configured such that, for the motor vehicles from the at least two vehicles series, at least one of
    different distances in a transverse direction (Y) of the motor vehicles are formed between interior surfaces of rear wheel wells of the motor vehicles,
    different distances in a longitudinal direction (X) of the motor vehicles are formed between connection lines of wheel contact points of rear wheels and heel plate cross-members, and
    different distances in a vertical direction (Z) of the motor vehicles are formed between lower edges of rear longitudinal members and lower edges of lateral longitudinal members of the motor vehicles.

2. The group of motor vehicles according to claim 1, wherein the forward sections of the rear longitudinal members, with the insertion of at least one of a heel plate and a heel plate cross-member, adjoin a uniformly-wide forward floor panel of the motor vehicles.

3. The group of motor vehicles according to claim 2, wherein the at least one of the heel plate and the heel plate cross-member, or components of the heel plate cross-member, have a uniform construction for the motor vehicles from the at least two vehicle series.

4. The group of motor vehicles according claim 1, wherein the forward sections of the rear longitudinal members have a fastening device for a component of a rear axle of the motor vehicles.

5. The group of motor vehicles according claim 2, wherein the forward sections of the rear longitudinal members have a fastening device for a component of a rear axle of the motor vehicles.

6. The group of motor vehicles according claim 3, wherein the forward sections of the rear longitudinal members have a fastening device for a component of a rear axle of the motor vehicles.

7. The group of motor vehicles according to claim 1, wherein the rearward section of the rear longitudinal members has a different length in the case of the motor vehicles from the at least two vehicle series.

8. The group of motor vehicles according to claim 2, wherein the rearward section of the rear longitudinal members has a different length in the case of the motor vehicles from the at least two vehicle series.

9. The group of motor vehicles according to claim 3, wherein the rearward section of the rear longitudinal members has a different length in the case of the motor vehicles from the at least two vehicle series.

10. The group of motor vehicles according to claim 4, wherein the rearward section of the rear longitudinal members has a different length in the case of the motor vehicles from the at least two vehicle series.

11. The group of motor vehicles according to claim 1, wherein the rear longitudinal members are connected together at their respective center sections by way of a cross-member.

12. The group of motor vehicles according to claim 2, wherein the rear longitudinal members are connected together at their respective center sections by way of a cross-member.

13. The group of motor vehicles according to claim 3, wherein the rear longitudinal members are connected together at their respective center sections by way of a cross-member.

14. The group of motor vehicles according to claim 4, wherein the rear longitudinal members are connected together at their respective center sections by way of a cross-member.

15. The group of motor vehicles according to claim 7, wherein the rear longitudinal members are connected together at their respective center sections by way of a cross-member.

16. The group of motor vehicles according to claim 1, wherein that the forward sections of the rear longitudinal members have a hole pattern for a jack housing, which is placed such that at least one of a uniform distance is formed from the longitudinal center line, and a uniform distance is formed from the forward jack housings.

17. The group of motor vehicles according to claim 2, wherein that the forward sections of the rear longitudinal members have a hole pattern for a jack housing, which is placed such that at least one of a uniform distance is formed from the longitudinal center line, and a uniform distance is formed from the forward jack housings.

18. The group of motor vehicles according to claim 3, wherein that the forward sections of the rear longitudinal members have a hole pattern for a jack housing, which is placed such that at least one of a uniform distance is formed from the longitudinal center line, and a uniform distance is formed from the forward jack housings.

19. The group of motor vehicles according to claim 4, wherein that the forward sections of the rear longitudinal members have a hole pattern for a jack housing, which is placed such that at least one of a uniform distance is formed from the longitudinal center line, and a uniform distance is formed from the forward jack housings.

20. The group of motor vehicles according to claim 7, wherein that the forward sections of the rear longitudinal members have a hole pattern for a jack housing, which is placed such that at least one of a uniform distance is formed from the longitudinal center line, and a uniform distance is formed from the forward jack housings.

* * * * *